Oct. 12, 1965 J. E. EHRREICH 3,211,584

RADAR ANTENNA

Filed Feb. 12, 1962

INVENTOR
JOHN E. EHRREICH
BY,
RUSSELL, CHITTICK & PFUND
ATTORNEYS 3,211,584
Patented Oct. 12, 1965

3,211,584

RADAR ANTENNA

John E. Ehrreich, Arlington, Mass., assignor to Chomerics, Inc., a corporation of Delaware Filed Feb. 12, 1962, Ser. No. 173,092
1 Claim. (Cl. 117—227)

Figure 1:
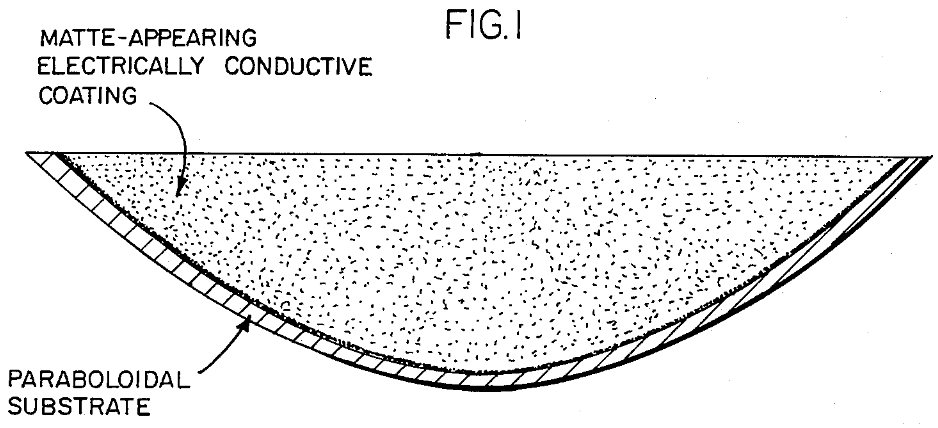

This invention pertains to a method of forming electrically conductive surfaces on supporting substrates by adhering an electrically conductive metallic powder thereon, and to the objects produced thereby. It is more particularly concerned with an unusual application technique for making plastic "soldered" connections, radar reflective surfaces, and the like.

In brief compass, this application technique comprises the steps of first coating a suitable supporting substrate surface with a relatively free-flowing liquid binder material such as an epoxy resin. The coated surface is then dusted with a relatively coarse electrically conductive metallic powder such as a silver powder. The size, shape, and density of the powder is such as to break the surface tension of the liquid binder on the substrate surface and come into particle-to-particle contact therein. The liquid binder is then cured to a solid form to hold the particles in place and in contact with each other. Excess powder, if any, is shaken off or otherwise removed either before or after curing of the binder.

Silver pastes consisting essentially of silver particles carried in liquid resin such as an epoxy or acrylate are being used as plastic "solders" to make electrical connections in applications where conventional metal soldering is not suitable, e.g., heat cannot be used, a metal solder will not bond to the surface or vibration resistance is needed. Plastic soldering is being used, for example, in the manufacture of electroluminescent panels where an electrical contact must be made with a tin oxide surface, in the fastening of leads to and the shorting out of wire wound resistors, and in the manufacture and repair of printed circuits. Effective electrical performance of a connection of this type depends upon particle-to-particle contact of the silver filler within the resin binder. It is necessary to highly load the resin with the metallic filler in order to achieve the requisite contacts between the particles, but this results in a heavy paste that is difficult to apply and not well suited to automated assembly lines because of the difficulty of dispensing.

The improved method of this invention for making plastic soldered joints, spot coatings, or extended coatings is based on the concept that it is better to separate the conductive metallic powder from the resin binder and to apply each of them separately in a two-step manner. This not only simplifies the application of each component of the conductive system, but also produces a superior bond. The liquid resin binder which is first applied has the opportunity to penetrate the surface to which it is to adhere. This is not the case with heavy silver pastes. This two-step process also circumvents the settling of the silver which occurs with the silver pastes and eliminates the waste associated with resin binders having short pot lives.

The present method has been successfully applied to the plastic soldering of leads on electroluminescent panels, the shorting of the ends of wound capacitors, and in other similar situations where a spot coating is desired. Quite precise areas can be defined by careful application of the unfilled resin. When the coated area is dusted or otherwise covered with the conductive metallic powder, the powder quickly absorbs or takes up the resin on the surface; thus, "drying" it and preventing further flow or loss of definition. The thickness of the conductive coating is controlled by the thickness of the resin coating. More than one layer can be applied before the binder is dried, cured, or otherwise converted to a solid form.

This two-step application technique has also been used to produce quite extended surface coatings that are useful, for example, as radar reflectors or antennas, in R.F.I. shielding applications, and for the elimination of static charges. The conductive surfaces produced by this method have a pleasing matte appearance.

The conductive metallic filler used is a desirable one that has a high mass-to-surface area ratio, preferably 0.0001 to 0.3 pound per square foot of surface area of the particles, such that the particles will readily sink into the resin coating. Relatively coarse spherical, or generally spherical, particles are also preferred for this reason. Average particle size is preferably in the range of 0.1 to 10 mils. The larger particle size, higher mass-to-surface area fillers permit the resin binder to accept a higher loading, which gives higher and more uniform electrical conductivities.

The outer surface at least of the metallic filler should consist of a noble metal. Non-noble metals such as copper and aluminum readily form electrically resistant oxide or sulfide coatings which prevent electrical contact between particles and cannot be used in plastic solders. While solid silver, gold, or platinum particles can be used as the metallic conductive filler in the practice of this invention, it is more economical to use base metal powders such as copper or iron that have been coated with a layer of a noble metal, as by replacement plating, electroplating or vacuum deposition. (See SN. 143,619, filed October 9, 1961, by the present inventor and now abandoned.)

The supporting surface on which the conductive coating is placed may be formed from an insulating, a semiconductive, or a conductive material. Radar reflective coatings can be formed on the surfaces of polyester spun-cast dish antennas. Printed circuits can be formed on XXX–P board by silk screening the clear resin in the pattern desired, and dusting with the conductive powder. Conductive bonds can be made to semiconductive manganese dioxide and tin oxide surfaces. The present technique has also been used to connect a grounding wire to a gold plated transistor header. It can be used to attach leads to thermistors.

The plastic binder used to hold the conductive metallic powder can be of any desired type and can be cured or set to a rigid form by any suitable means, e.g., heat curing, solvent evaporization, air-drying, irradiation and cooling. Two-component (resin and hardener) epoxy systems are preferred because of their excellent properties, but solutions and emulsions of acrylates, rubbers, polyamides, polyacetates, and polyvinyl chlorides, for example, can also be used. A relatively low viscosity liquid system is preferred, i.e., one having a viscosity up to 20,000 centipoises. Heating of the resin coating and/or making a solution or emulsion can be used to control the viscosity.

The conductive metallic powder can be applied to the liquid resin coating by simple dusting or distribution over the surface with gravity causing the powder to sink into the liquid coating, or the powder can be applied by jet spraying, the fluidized bed technique or other suitable method. In the range of 40 to 67, usually 50 to 60, volume percent of the conductive mass will consist of the conductive powder and the remainder will be the resinous binder.

Figure 2:
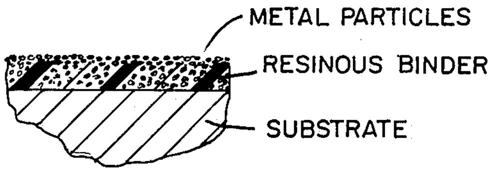

The drawings illustrate in section (FIG. 1) a paraboloidal radar antenna of the type shown in U.S. Patent No. 2,923,934, except that the surface (see FIG. 2) of the antenna has been made conductive and thus radar reflective in accordance with the procedure of the present invention, as more fully described in the following Example III.

The conductive metallic powder used in the following examples was copper powder replacement plated with 5 weight percent silver, as described in Example I of SN. 143,619. The plated powder had an average particle size of about 2 mils, a specific density of 552 pounds per cubic foot, and a surface area of 45 square feet per pound. All of the coatings of the examples had resistivities of less than 0.01 ohm per centimeter.

*Example I*

The leads to the tin oxide coating of a commercially manulfactured electroluminescent panel were bonded by the method of this invention. The panel was a flat rectangle, 3⅝ x 4¾ inches. To opposite corners were slightly downwardly turned and had spots uncoated with the protective ceramic glaze for copper leads to connect to the tin oxide surface. The copper leads were held in position by nylon inserts. The resin used consisted of 20 weight percent of orthocresol glycidyl ether and 80 weight percent of the diepoxide of bisphenol-A. Triethylene tetramine was used as the hardener in the amount of 14 weight percent on resin. The resin-hardener mixture had a viscosity of about 1,000 centipoises at 25° C. One drop of resin-hardener mixture was placed at the points where the copper leads contacted the tin oxide surface. The conductive powder was then dusted on, and the excess shaken off. The resin binder was cured for ½ hour at 100° C. The bond obtained was electrically conductive and superior to the bond obtained with the formerly used silver pastes. Panels made by this method successfully passed the humidity cabinet life test which involves maintaining the lamps lighted for over 500 hours at 100° F. and 100 percent relative humidity.

*Example II*

The ends of aluminum foil wrapped condensers (1¾ inches long x ½ diameter) were shorted and the lead wires connected by the same method. The same resin binder was used and the bond obtained was surprisingly strong since the resin had the opportunity to penetrate the layers of aluminum and paper.

*Example III*

A radar reflective coating having an attenuation of 24 decibels was formed on the surface of a sheet of XXX–P board by coating the surface of the board with the clear epoxy resin, and allowing the conductive powder to flow from one side to the other while the board was held in a slightly canted position. The coating had a thickness of about 7 mils.

Having described this invention, what is sought to be protected by Letters Patent is succinctly set forth in the following claim.

What is claimed is:

A radar antenna comprising a matte-appearing electrically conductive surface bonded to a paraboloidal substrate surface, said electrically conductive surface comprising metal particles and a cured resinous binder holding said metal particles in electrical particle-to-particle contact; said metal particles having an outer surface of a noble metal, a mass-to-surface-area ratio in the range of 0.0001 to 0.3 pound per square foot, a generally spherical particle shape and an average particle size in the range of 0.1 to 10 mils, and the resistivity of said electrically conductive surface being less than 0.01 ohm per centimeter.

References Cited by the Examiner

UNITED STATES PATENTS

| | | | |
|---|---|---|---|
| 475,528 | 5/92 | Willms | 117—31 X |
| 904,444 | 11/08 | Paton | 117—31 |
| 2,502,489 | 4/50 | Sparklin | 117—33 X |
| 2,506,604 | 5/50 | Lokker et al. | 117—31 |
| 2,923,934 | 2/60 | Halpern | 117—227 |

FOREIGN PATENTS

| | | |
|---|---|---|
| 96,569 | 6/60 | Norway. |
| 833,000 | 4/60 | Great Britain. |
| 340,434 | 9/59 | Switzerland. |

OTHER REFERENCES

National Bureau of Standards Miscellaneous Publication 192, pp. 4 and 5 relied on, November 22, 1948.

JOSEPH B. SPENCER, *Primary Examiner.*

MORRIS LIEBMAN, RICHARD D. NEVIUS, *Examiners.*